J. F. KOUKAL.
GOPHER TRAP.
APPLICATION FILED NOV. 24, 1920.
1,404,032.
Patented Jan. 17, 1922.
2 SHEETS—SHEET 2.
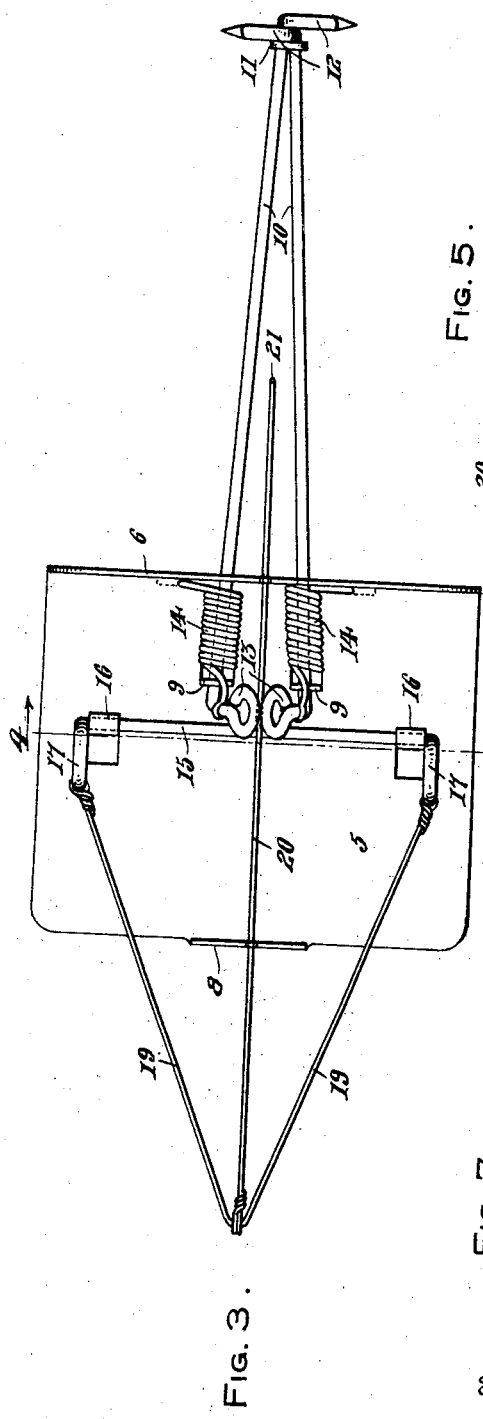
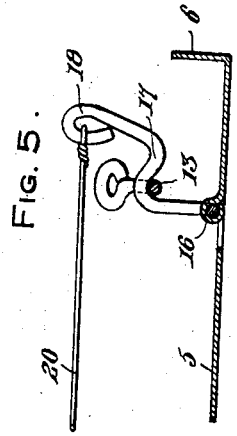
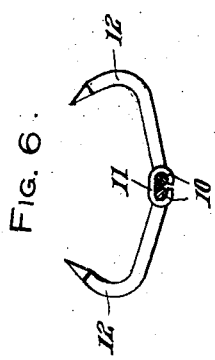
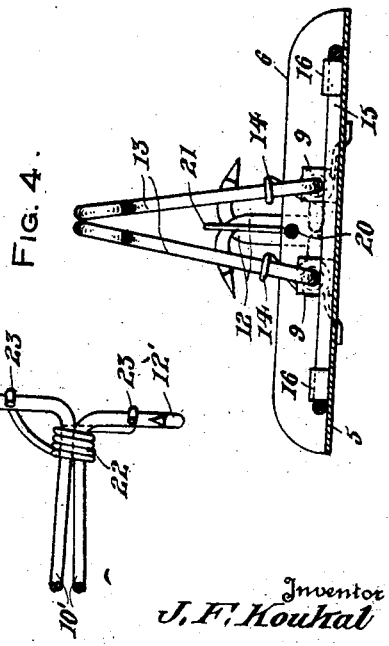
Inventor
J. F. Koukal
By A. M. Wilson
Attorney

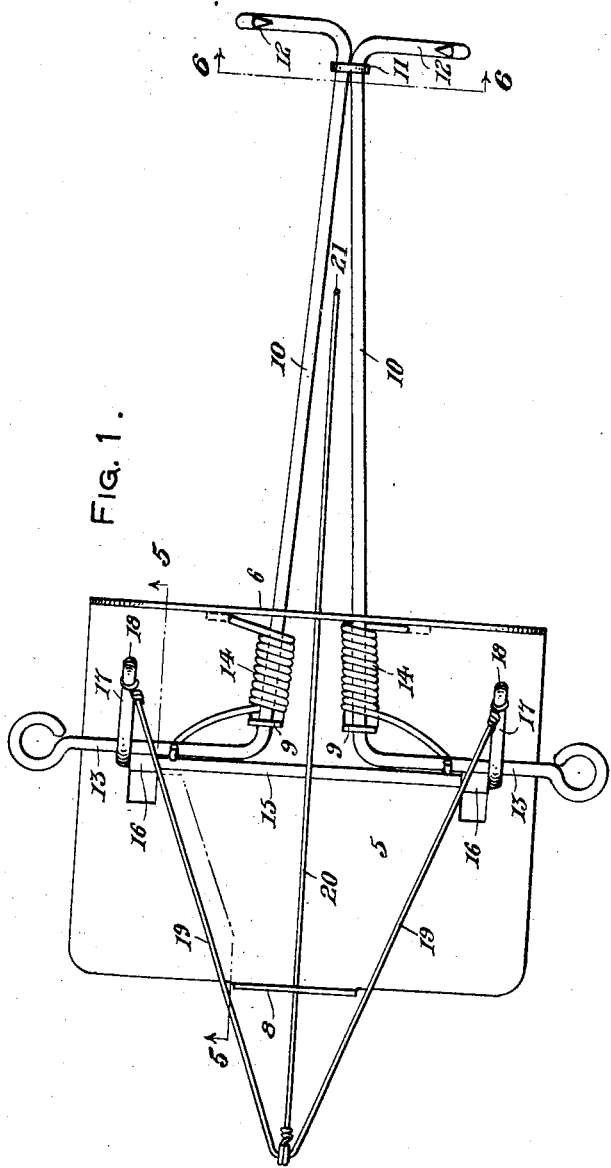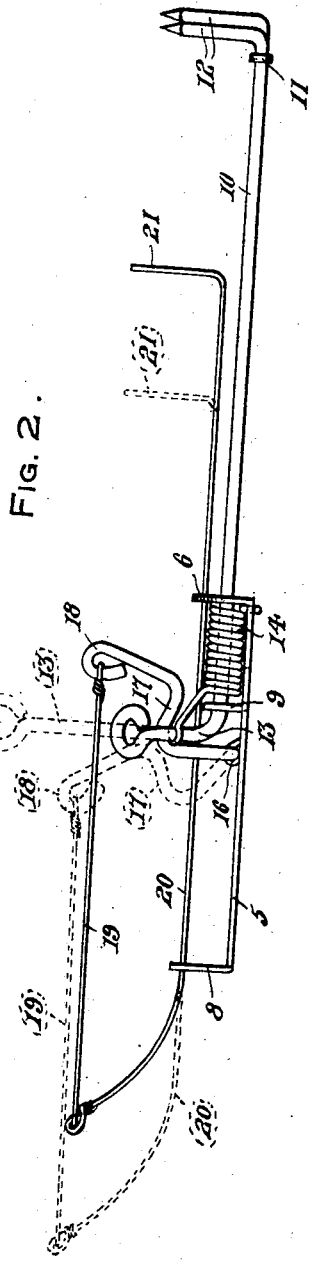

UNITED STATES PATENT OFFICE.

JOSEPH F. KOUKAL, OF BRUNO, NEBRASKA.

GOPHER TRAP.

1,404,032. Specification of Letters Patent. Patented Jan. 17, 1922.

Application filed November 24, 1920. Serial No. 426,153.

*To all whom it may concern:*

Be it known that I, JOSEPH F. KOUKAL, a citizen of Czecho-Slovakia, residing at Bruno, in the county of Butler and State of Nebraska, have invented certain new and useful Improvements in Gopher Traps, of which the following is a specification.

This invention relates to certain new and useful improvements in gopher traps and aims to provide an extremely durable and efficient device of this kind which may be cheaply and easily manufactured as well as placed into use.

Briefly described, the invention contemplates a gopher trap embodying a pair of horizontal rotatably mounted rods formed at one end of the trap to provide impaling means and at the other end gripping jaws so as to combine the features of both a jaw and an impalement trap, the rods being provided with means for axially rotating the same so as to move the impaling spurs toward and past each other and the jaws toward each other, and simple and efficient means being provided for mounting the rods as well as for retaining the jaws in set position.

Other objects will appear as the nature of the invention is better understood and the same consists in the novel form, combination and arrangement of parts hereinafter more fully described and shown in the accompanying drawings, wherein like reference characters indicate similar parts throughout the several views.

In the drawings,

Figure 1 is a top plan view of a trap constructed in accordance with the present invention, Figure 2 is a side elevational view thereof and showing by dotted lines the position of the parts when the trap is released, Figure 3 is a view similar to Figure 1 when the trap is released, Figure 4 is a transverse sectional view taken upon line 4—4 of Figure 3, Figure 5 is a longitudinal section taken upon line 5—5 of Figure 1, Figure 6 is a transverse sectional view taken upon line 6—6 of Figure 1, and Figure 7 is a fragmentary top plan view showing a modification of a detail of the invention.

Referring more in detail to the several views, the present invention embodies a sheet metal plate 5 having its forward edge bent upwardly to provide an upright flange 6 and having its rear edge provided with an upstanding ear 8 substantially midway between the side edges thereof.

The plate 5 is stamped out to provide upstanding bearing ears 9 between the flange 6 and ear 8, and the pair of forwardly converging rods 10 are journaled in the ears 9 as well as through the flange 6. Rods 10 project forwardly and are held in close relation at their forward ends by means of a band 11 loosely surrounding the same, said rods being bent at their outer ends to provide opposed impalement hooks or spurs 12.

The inner ends of the rods 10 are bent at right angles to provide jaws 13, and a coil spring 14 surrounds each rod 10 and has its ends associated with the plate 5 and the adjacent jaw 13 so as to normally rotate the rods 10 for swinging the jaws 13 toward each other in the position of Figure 4 with the impaling spurs 12 crossed as shown in Figures 3 and 4.

Means is provided for retaining the jaws 13 separated and substantially horizontally disposed with the spurs 12 also separated and the trap in set position. This means includes a transverse shaft 15 journaled upon the plate 5 transversely of the trap in bearings 16 which are preferably formed by suitably stamping out the plate 5 and bending the stamped out portions into the form of sleeves which encircle said shaft. The opposite ends of the shaft 15 are bent at right angles and then bent forwardly and upwardly so as to provide overhanging keeper portions 17 and attaching portions 18 for the trip rods 19. The keeper portions 17 overlie the ends of the jaws 13 so as to maintain the latter separated when the keeper portions are swung forwardly as shown in Figure 2. The trip rods 19 are fastened at their forward ends to the portions 18 and extend rearwardly from the latter in converging relation where they are attached to a centrally and longitudinally disposed actuating rod 20 which is slidably disposed through the ear 8 and the flange 6 and extends forwardly to a point substantially midway between the spurs 12 and the jaws 13. The forward end of the operating rod 20 is bent upwardly as at 21 to receive the desired bait.

In operation, the gopher attempting to remove the bait from the end portion of the rod 20 causes rearward movement of the latter so as to exert a slight pull upon the rods 19 whereby the end portions 17 and 18 of the shaft 15 are pulled rearwardly to the dotted line position of Figure 2 thus freeing the jaws 13 and allowing the springs 14 to revolve the rods 10. In case the animal is not positioned to be caught by the spurs 12, he will probably be caught by the jaws 13 and effectively held until removed from the trap when the latter is released.

As shown in Figure 7, the springs 14 may be eliminated by utilizing a spring 22 in place of the band 11 for swinging the jaws 13 and spurs 12 toward each other when the trap is released, or the spring 22 may be employed in addition to the springs 14 and the band 11 eliminated. As shown, spring 22 is coiled around the rods 10' adjacent the spurs 12' so as to hold said rods 10' together and the ends of the spring 22 are bent around the spurs 12' as at 23 so as to insure movement of the spurs 12' toward each other under the influence of said spring.

It is believed that the construction and operation as well as the advantages of the present invention will be readily apparent to those skilled in the art from the foregoing description.

Minor changes may be made without departing from the spirit and scope of the invention as claimed.

What is claimed as new is:

A trap of the class described including a base plate, a pair of rods journaled upon and projecting from said base plate having angularly bent rear ends forming jaws, with angularly bent and curved forward ends forming impalement spurs, yieldable means to normally rotate said rods, trip operated means to release said jaws and to maintain the same operated including a rod transversely of the base plate so bent at its ends to provide keeper portions for maintaining the jaws in an open position, a longitudinal rod slidable within upstanding keeper flanges provided in the rear and forward ends of the base plate, the said rod being upwardly curved at its rear end and provided with an eye, and means engageable with the eye of said rod and the ends of the transverse rod for rotating the said transverse rod.

In testimony whereof I affix my signature.

JOSEPH F. KOUKAL.